W. T. DUVALL.
Brick-Machine.
No. 202,336. Patented April 16, 1878.
Fig. 1.
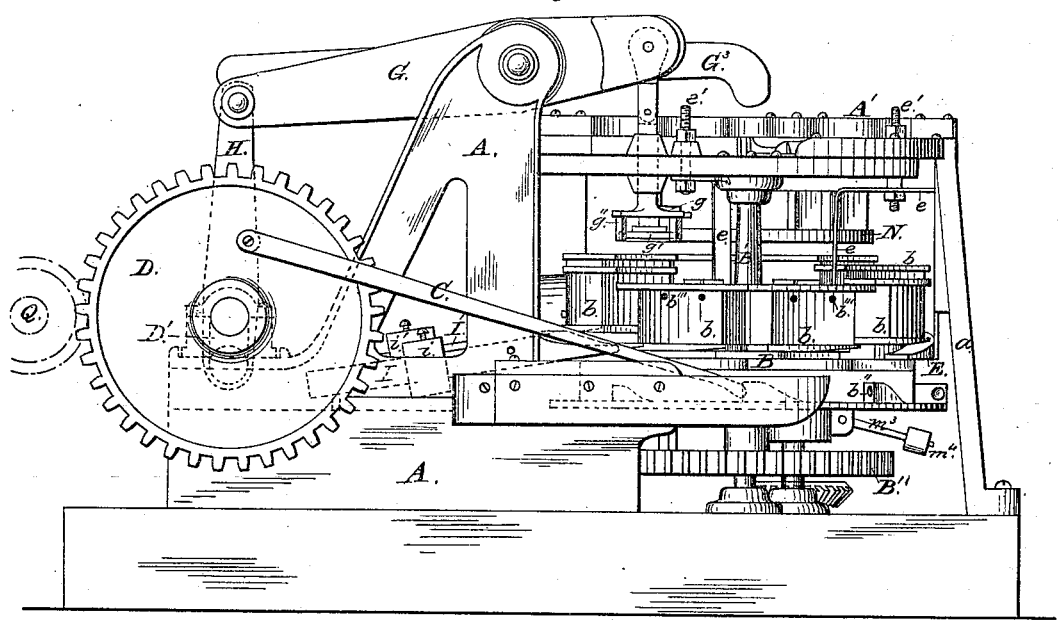
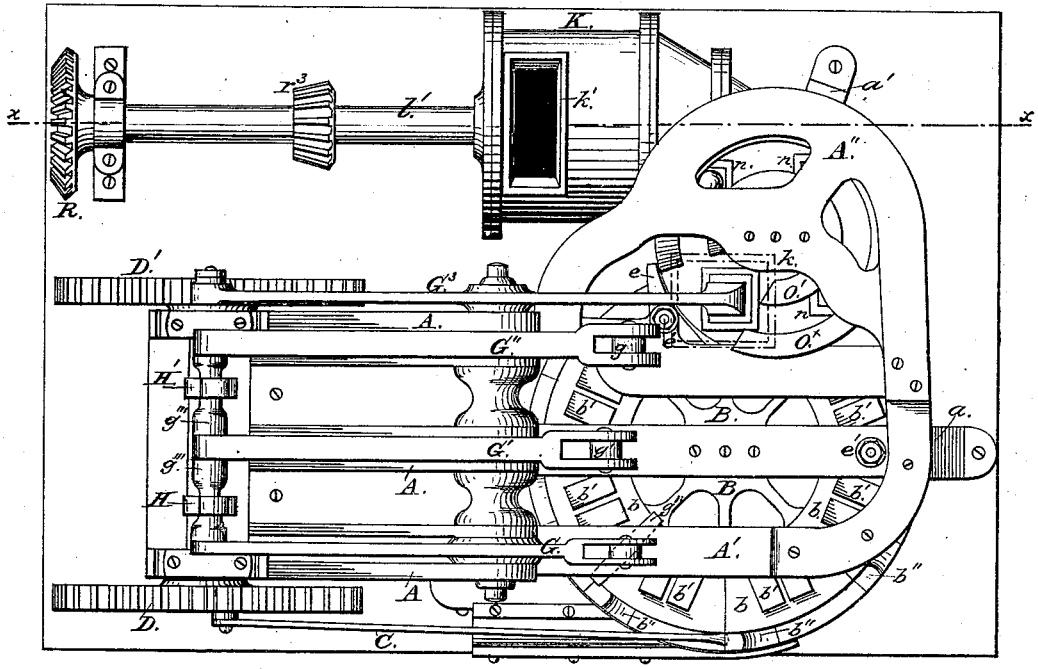
Fig. 2.
Witnesses:
Charles B. Cropley
Mayhew Plater
Fig. 14.
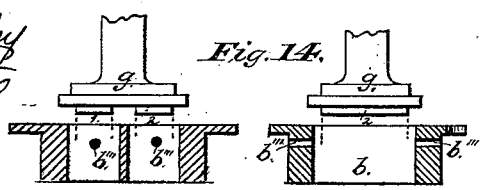
Inventor:
W. T. Duvall W. T. DUVALL.
Brick-Machine.
No. 202,336. Patented April 16, 1878.
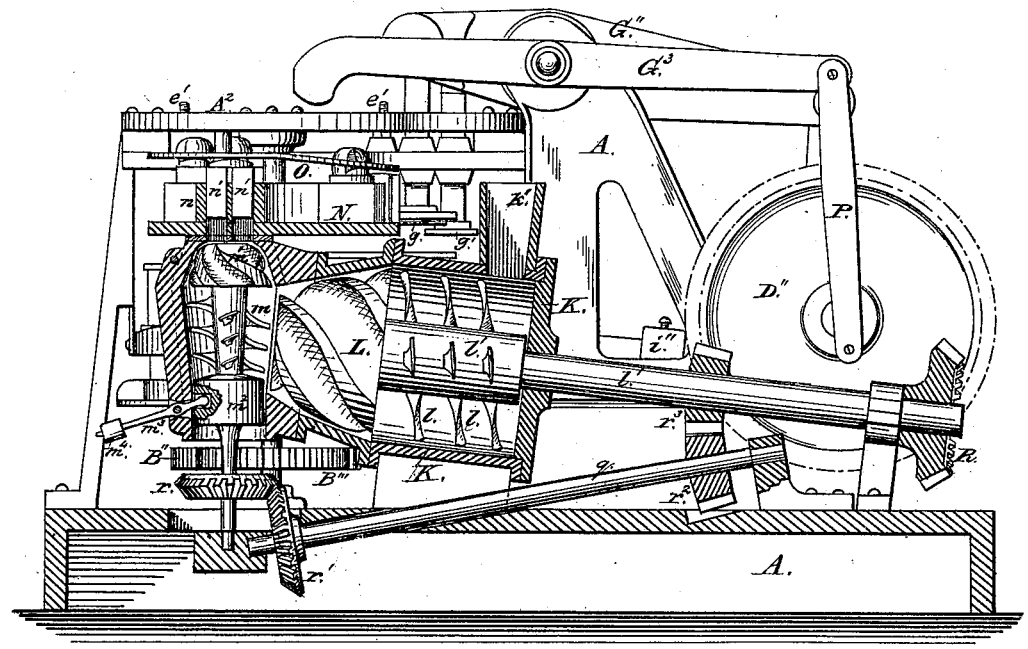
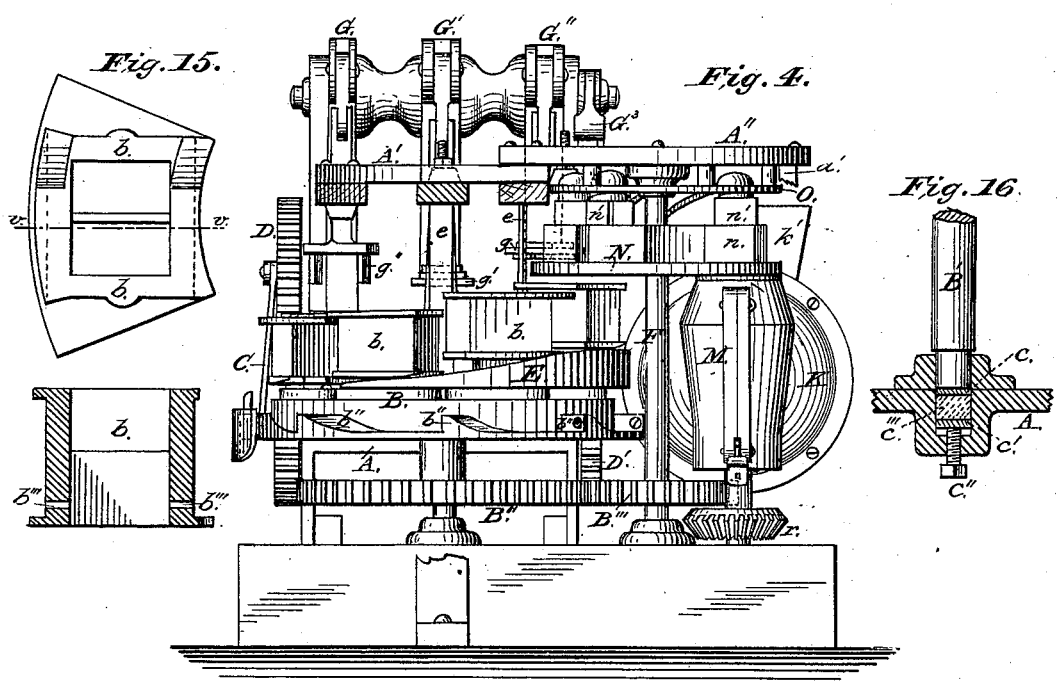
Witnesses:
Charles B. Copley
Mayhew Plate
Inventor
W. T. Duvall 3 Sheets—Sheet 3.
W. T. DUVALL.
Brick-Machine.
No. 202,336. Patented April 16, 1878.
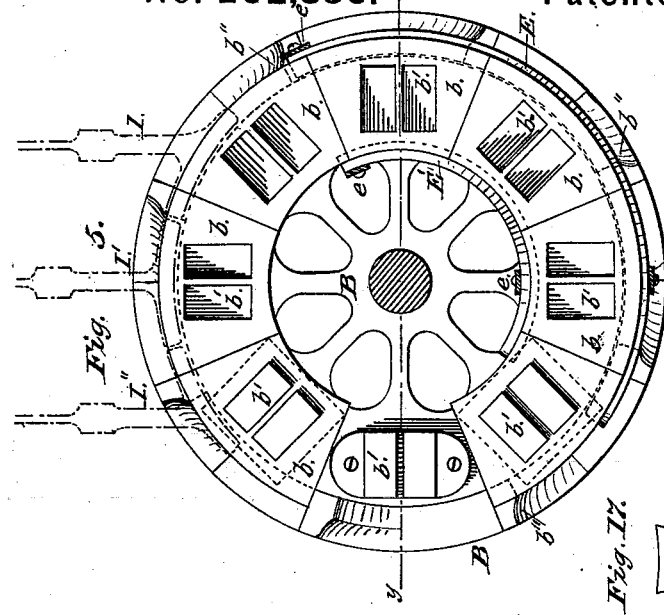
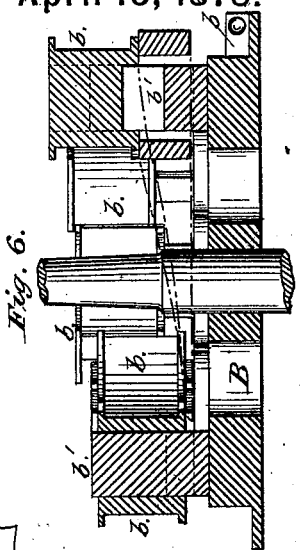
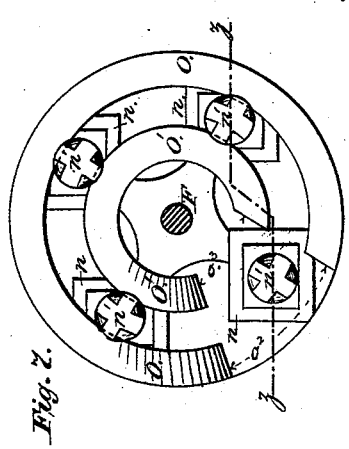
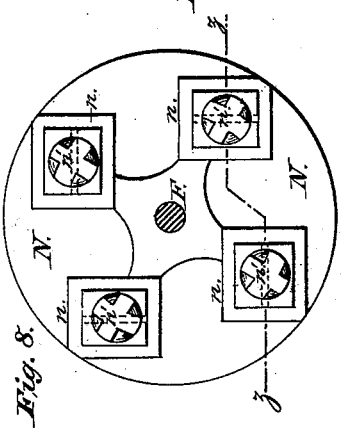
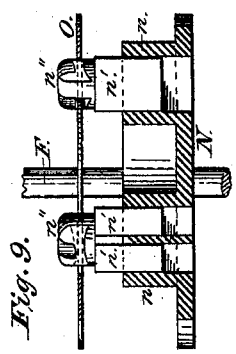
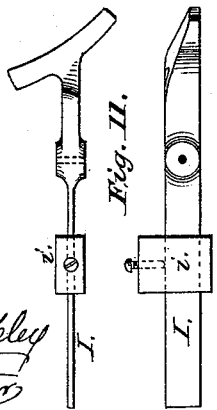
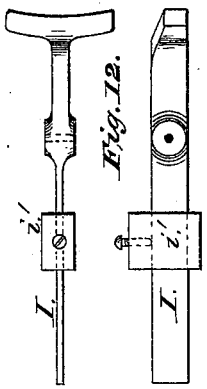
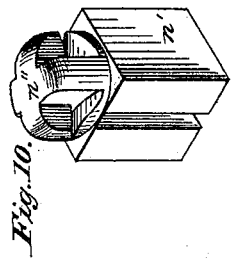
Witnesses:
Charles B. Cropley
Mayhew Plater
Inventor:
W. T. Duvall

UNITED STATES PATENT OFFICE.

WILLIAM T. DUVALL, OF GEORGETOWN, DISTRICT OF COLUMBIA, ASSIGNOR OF TWO-THIRDS HIS RIGHT TO RICHARD L. CROPLEY AND ARTHUR B. CROPLEY, OF SAME PLACE.

IMPROVEMENT IN BRICK-MACHINES.

Specification forming part of Letters Patent No. 202,336, dated April 16, 1878; application filed March 19, 1878.

*To all whom it may concern:*

Be it known that I, WILLIAM T. DUVALL, of Georgetown, in the District of Columbia, have invented certain new and useful Improvements in Brick-Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to brick-machines; and the object is to furnish a machine that will make bricks of a better quality than those now in general use, by making the corners squarer, and of any desired thickness, and that can be used for making bricks of dry or tempered clay.

The invention consists of a suitable frame, in which is mounted a horizontally-revolving mold-wheel, moved intermittingly by a push-pawl and cams or ratchet-teeth. To this wheel the followers are cast or secured in any manner, while the molds slide up and down on them, which is an important feature of my invention. Said molds are raised by suitable cams, made vertically adjustable, so as to vary the thickness of bricks, and they are depressed by pressers or plungers, operated by beams or levers connected to a crank-shaft and suitable gearing, from which they receive their motion.

If it is desired to make bricks out of tempered instead of dry clay, the clay is first introduced into a horizontal pug or tempering mill, provided with the usual knives or mixers and a conical screw, by which the clay is fed or forced into a smaller vertical pug-mill or mixer, also provided with knives and a screw, which force the clay through apertures of the shape of a brick into molds in a secondary or auxiliary horizontal revolving wheel, slightly elevated above the first wheel. The followers of the auxiliary wheel are operated by cam-shaped plates; and as the molds of this wheel (called "glut-wheel") come over the respective molds in the first or main wheel, the followers press them out into the latter or finishing molds, where they are finished.

It also consists in providing a safety apparatus on the upright pug-mill, to prevent choking of the mill in case the clay should be fed too fast, or the mill become obstructed in any way, all of which will be more fully described hereinafter, reference being had to the accompanying drawings, in which—

Figure 1 is a side elevation of the machine. Fig. 2 is a plan or top view of the same. Fig. 3 is a longitudinal section on line $x\,x$ of Fig. 2. Fig. 4 is an end view of the same. Fig. 5 is a plan view of the mold-wheel. Fig. 6 is a cross-section on line $y\,y$ of Fig. 5. Fig. 7 is a plan view of the auxiliary mold-wheel, showing the cam-plates. Fig. 8 is a plan view of the auxiliary mold-wheel with the plates removed. Fig. 9 is a cross-section on line $z\,z$, Fig. 7. Fig. 10 is a perspective view of a follower for the auxiliary mold-wheel. Figs. 11 and 12 are top and side views of the balancing-levers for the molds. Fig. 13 shows the form of the brick before finishing the corners. Fig. 14 is a cross and transverse section of part of the mold and one of the plungers. Fig. 15 is a bottom view and section of the mold. Fig. 16 is a detail view of the mold-wheel shaft and its step. Fig. 17 is a view of the glut-bricks.

In the drawings, A represents a suitably-constructed frame, in the forward part of which is mounted the horizontal revolving wheel B, provided with any desired number of molds, $b$, (eight being shown,) and secured to shaft $B'$. This shaft is provided with a step below, in which is arranged an upper and lower plate, $c\,c'$, and an adjusting-screw, $c''$, between the two plates is placed a rubber or other spring, $c'''$, of sufficient tension to slightly raise the mold-wheel from the frame, so that it can freely revolve, until pressure is brought to bear on the molds, when it is immediately stopped by the friction against the frame. The molds are preferably made double, but may contain three, four, or more, and they slide up and down upon the stationary or fixed followers $b'$, cast or otherwise secured to the mold-wheel B. This wheel B has the same number of ratchet-teeth $b''$ as there are molds, and with said teeth a pivoted pawl, C, secured to and receiving motion from the gear-wheel D, mounted on the crank-shaft D', engages and rotates the wheel.

Projecting from, and connected to the main frame A, and a proper distance above the mold-wheel B, is an extension-frame, A', supported at its outer end by a foot or brace, $a$; and connected to this frame is another side frame, (marked A'',) supported by a foot or brace, $a'$. On one side of the mold-wheel B is arranged an inner and outer cam-shaped piece, E E', suspended from the frame A' by pieces $e\ e$, and made adjustable by bolts and nuts $e'$, by which the thickness of the bricks can be varied as desired. The molds are provided with small apertures $b'''$, through which any surplus clay or air can be forced. Below the mold-wheel, and secured to the shaft B', is the gear-wheel B'', which meshes into and receives motion from the pinion B''', mounted on the shaft F. In the upper part of the frame A are journaled three beams or levers, G G' G'', to which are pivoted the plungers $g\ g'$ and the stripper $g''$. The plunger $g$ is provided with two projections, 1 and 2, which are somewhat smaller than the molds, so as to compress the clay in the center and force the air toward the sides and ends, and leave it of the form shown in Fig. 13, so that in passing to the next plunger $g'$, which is provided with a flat face, the clay is forced out into the corners of the mold, and the corners of the bricks are thus well defined and cornered. By the next movement of the mold-wheel B, the mold is forced down on the follower $b'$ by the stripper $g''$, and the brick is carried off on an endless belt or other suitable device. The plungers $g\ g'$ and stripper $g''$ are hinged or jointed to the beams G G' G'', so as to give them a vertical movement, and so that they can accommodate themselves to the arc of the circle formed by the ends of the beams at the same time. The rear ends of the beams G G' G'' are connected by a cross-piece, $g'''$, to which the connecting-rods H H' are attached, and they connect with the crank-shaft D', mounted in suitable bearings, and said beams receive motion therefrom. In the revolution of the mold-wheel the molds are alternately raised as they pass around by the cams E E'. After passing over these cams they are alternately supported by the pivoted levers I I' I'', which are counterbalanced by weights $i\ i'\ i''$, to sustain the weight of the mold, but yielding to the pressure of the plungers $g$ and $g'$ and strippers $g''$, so as to admit of the mold passing down.

In making bricks of what is termed "dry clay," a hopper, as shown in dotted lines $k$, Fig. 2, is placed on the machine, and the machine is put in motion without the other parts being necessary. If it is, however, desired to make bricks of tempered clay, it is introduced into the hopper $k'$ of the horizontal or inclined pug or tempering mill K, in which is arranged a series of spirally-arranged knives, blades, or mixers, $l$, on a shaft, $l'$, by which the clay is tempered, and is then forced by the screw L into the small vertical pug-mill M, which is also provided with a number of spirally-arranged blades or mixers, $m$, and a screw $m^1$, by which the clay is forced through the apertures at the upper mouth of the pug-mill M, and into the glut-molds $n$ of the mold-wheel N. At the lower end of the shaft of the pug-mill M is an enlarged collar, $m^2$, into which one end of the pivoted lever $m^3$ is inserted. This lever is counterbalanced by a weight, $m^4$, in such a manner that in case the clay is fed too fast, or some obstruction occurs, the collar $m^2$ and weighted lever $m^3$ will be forced down in the pug-mill case, it thus acting as a safety apparatus. When the demand is made for more clay to fill the molds, the weighted lever descends and supplies the clay to the molds. The followers $n'$, fitting into the glut-molds, are suspended, by means of grooved heads $n''$, between the cam-plates O O', secured to the frame A'', until they reach the open space $o^2$ $o^3$, when they are forced down by a beam or lever, G'', which receives motion by means of a connecting-rod, P, from the wheel D''.

Motion is imparted to wheels D D' by suitable pinions on a cross-shaft, Q, (shown in dotted lines, Fig. 1,) and also to the bevel-wheel R on the shaft $l'$ of the pug-mill, and the vertical pug-mill is operated by the bevel-wheels $r\ r'\ r''$ and the inclined shaft $q$, with bevel-wheel $r^3$. Suitable sand-boxes can be applied to both sets of molds, if desired. The clay is thus discharged from the glut-molds $n$ into the lower mold $b$ of the mold-wheel B. These glut-molds are made somewhat smaller in breadth and length, but greater in depth, so that the clay, or "glut brick," as it is called, will easily drop into the lower or finishing molds $b$. The ends and sides of these glut-molds are also made slightly convex, so as to make the sides and ends of the glut-brick concave, as shown in Fig. 17.

The operation is as follow: The clay, being introduced into the pug-mill K, is forced into the vertical pug-mill M, and from this into the glut-molds of the auxiliary wheel N. After being rotated to the proper position, the glut-brick contained in the glut-mold of said wheel are forced, by the lever G'' and the followers or plungers $n'$, into the finishing-molds $b$ of the mold-wheel B, where the first plunger $g$ gives it the form shown in Fig. 13, after which it passes to the plunger $g'$, which gives it the finishing pressure, and it then passes on to the stripper $g''$, which forces the mold down on the follower, and leaves the brick on the top of the follower, whence it can be removed by an endless belt, or in any other suitable manner.

The advantages of my machine are, that by making the followers fixed and the molds sliding thereon, the edges of the molds or followers cannot be broken or chipped off and the delicate and firm fitting required where followers move into the molds is entirely obviated, as the pressers or plungers do not enter the molds; by first making a thick glut-brick, and then molding the finished bricks, as described, air-bubbles are avoided, and the bricks receive sharp and well-defined corners; by the adjustable cam-plates bricks of any desired thickness can be made; by the elastic bearing of the shaft of the mold-wheel it will easily revolve, and can be readily adjusted. The whole machine is very compact and reliable in its operation, and the parts are not liable to get out of order.

Having thus described my invention, what I claim, and desire to secure by Letters Patent, is—

1. In a brick-machine, a mold-wheel, B, provided with fixed followers $b'$, upon which the mold $b$ slides, as shown and described.

2. In a brick-machine, the adjustable cams E E', in combination with a mold-wheel, B, provided with fixed followers $b'$, and the sliding molds $b$, substantially as shown and specified.

3. In a brick-machine, the auxiliary mold-wheel N, provided with glut-molds $n$, plungers $n'$, and cam-plates O O', arranged as shown and specified.

4. In a brick-machine, the pug-mill M, provided with the safety apparatus $m^2 m^3 m^4$, constructed substantially as shown, and for the purpose specified.

5. In a brick-machine, the combination of a mold-wheel, B, provided with fixed followers $b'$ and sliding molds $b$, with an auxiliary wheel, N, provided with glut-molds $n$ and suspended followers $n'$, arranged substantially as shown and specified.

6. In a brick-machine, the counterbalanced levers I I' I'', in combination with the mold-wheel B, provided with fixed followers $b'$ and sliding molds $b$, substantially as shown, and for the purpose described.

7. The combination of the pawl C and wheel D with the mold-wheel B, provided with ratchet-teeth $b''$, fixed followers $b'$, and sliding molds $b$, all arranged and operating as shown, and for the purpose set forth.

8. The combination of the mold-wheel B, constructed, as described, with the plungers $g$ and $g'$, stripper $g''$, and the beams G G' G'', arranged as shown and herein specified.

9. The combination of the mold-wheel B with the auxiliary mold-wheel N, vertical pug-mill M, and horizontal pug-mill K, arranged for operation substantially as shown, and for the purpose specified.

10. The brick-machine herein described, consisting of the frames A A' A'', the mold-wheel B, auxiliary mold-wheel N, vertical pug-mill M, horizontal pug-mill K, beams G G' G'', plungers $g$ $g'$, stripper $g''$, cam-plates E E' O O', and suitable gearing, all arranged substantially as shown, and for the purpose specified.

In testimony that I claim the foregoing as my own I hereby affix my signature in presence of two witnesses.

WM. T. DUVALL.

Witnesses:
   CHARLES B. CROPLEY,
   MAYHEW PLATER.